US008037294B2

(12) United States Patent
Nochta

(10) Patent No.: US 8,037,294 B2
(45) Date of Patent: Oct. 11, 2011

(54) AUTHENTICATION OF PRODUCTS USING IDENTIFICATION TAGS

(75) Inventor: Zoltan Nochta, Karlsruhe (DE)

(73) Assignee: SAP AG, Walldorf (DE)

( * ) Notice: Subject to any disclaimer, the term of this patent is extended or adjusted under 35 U.S.C. 154(b) by 1526 days.

(21) Appl. No.: 11/399,769

(22) Filed: Apr. 7, 2006

(65) Prior Publication Data

US 2006/0230276 A1 Oct. 12, 2006

(30) Foreign Application Priority Data

Apr. 7, 2005 (EP) .................................... 05102727

(51) Int. Cl.
*H04L 29/06* (2006.01)
*H04L 9/00* (2006.01)
*G06F 21/00* (2006.01)
*G06F 12/14* (2006.01)

(52) U.S. Cl. ........ 713/150; 713/156; 713/157; 713/159; 713/167; 713/172; 713/173; 713/182; 713/185; 713/193; 713/194; 726/2; 726/5; 726/6; 726/9; 726/20; 726/29; 726/34; 380/201; 380/277; 380/279; 380/282; 380/285

(58) Field of Classification Search .................. 713/150
See application file for complete search history.

(56) References Cited

U.S. PATENT DOCUMENTS 4,543,766 A * 10/1985 Boshinski ......................... 53/64
5,390,794 A * 2/1995 Vulpitta ..................... 206/459.1
5,640,002 A * 6/1997 Ruppert et al. .......... 235/462.46
6,226,619 B1 * 5/2001 Halperin et al. .................. 705/1
6,629,198 B2 * 9/2003 Howard et al. ............... 711/112
7,096,151 B2 * 8/2006 Klein ............................ 702/173
2003/0024982 A1 2/2003 Bellis et al.
2004/0054792 A1 * 3/2004 Pitsos ........................... 709/229
2004/0103033 A1 5/2004 Reade et al.
2004/0148260 A1 * 7/2004 Matsuda et al. ................ 705/57
2004/0166063 A1 * 8/2004 Siegel .......................... 424/10.1
2004/0171373 A1 * 9/2004 Suda et al. .................... 455/415
2005/0049979 A1 * 3/2005 Collins et al. ................... 705/75
2005/0081040 A1 * 4/2005 Johnson et al. ............... 713/176
2005/0114222 A1 * 5/2005 Mundy ........................... 705/26
2005/0134436 A1 * 6/2005 Brookner ................... 340/14.69
2005/0280537 A1 * 12/2005 Feltz et al. ................. 340/572.1
2006/0010503 A1 * 1/2006 Inoue et al. ..................... 726/30
2006/0054682 A1 * 3/2006 de la Huerga ................. 235/375
2006/0091208 A1 * 5/2006 He et al. ........................ 235/385
2006/0224355 A1 * 10/2006 Morrison et al. ............. 702/173
2007/0299686 A1 * 12/2007 Hu et al. .......................... 705/1
2008/0093448 A1 * 4/2008 de la Huerga ................. 235/385
2010/0253510 A1 * 10/2010 Waterhouse et al. .... 340/539.32

FOREIGN PATENT DOCUMENTS

GB 2391988 A 2/2004

* cited by examiner

*Primary Examiner* — Edan Orgad
*Assistant Examiner* — Jenise Jackson
(74) *Attorney, Agent, or Firm* — Brake Hughes Bellermann LLP

(57) ABSTRACT

An identification tag for authenticating a product is associated with the product and has authentication data transmissible to a reader device. The authentication data include source data including a tag identifier that uniquely identifies the identification tag and a signature value that is a result of a private key encryption of a representation of the source data, where the private key encryption uses a private key of a public key encryption method.

34 Claims, 6 Drawing Sheets

AUTHENTICATION OF PRODUCTS USING IDENTIFICATION TAGS

CLAIM OF PRIORITY

This application claims priority under 35 U.S.C. §119 to European Patent Application Number: 05102727.4, filed on Apr. 7, 2005, the entire contents of which is hereby incorporated by reference.

TECHNICAL FIELD

This description generally relates to the field of electronic data processing and particularly to the use of tags associated with products.

BACKGROUND

In today's world, many products are exchanged between different parties. Frequently, modern products are produced by a division of production processes. The products may be produced in one location and require further products that are produced in a different location. The required products may be produced by specialized producers and they may be procured from distributors. Furthermore, a division of sales and distribution processes may lead to additional exchanges of products.

The exchange of the products frequently renders the products anonymous. Therefore, a way of identifying the products uniquely and automatically is desirable. This may be done by using identification tags that are associated with the products. The tags may be read by a reader device and may provide, for example, a material number that uniquely specifies a product type. A product type can identify equivalent products but usually does not identify an individual product of the product type. One example for an identification tag is a printed bar code on a package of a product. The bar code can be read with an optical reader device, and the material number can be obtained from the read data. A further example is a passive radio frequency identification tag (RFID tag) that may be attached to the product or the package. The RFID tag can be read with a radio frequency identification reader device (RFID reader device). Reading the transmissible data from the RFID tag is fast and can be automated. Furthermore, the RFID tag may provide further data, such as, for example, an electronic product code identifying each product uniquely.

The exchange of products may permit the introduction of counterfeited products into production processes or sales and distribution processes. The counterfeited products are sold as authentic products but they are not authentic because they are not produced by an authentic producer. The counterfeited products can be of an inferior quality compared to authentic products. They may also be different with regards to a specific characteristic from the authentic products. Due to this, the counterfeited products can cause severe damages to a purchaser of such products. A producer of counterfeited products may not be held responsible for the damages and consequently may not take care to prevent the damages. Furthermore, the counterfeited products may damage a reputation of the authentic products and pose financial risks to the authentic producer.

SUMMARY

Thus, techniques are described for distinguishing counterfeited and authentic products.

According to one general aspect, an authentic product can be distinguished from a counterfeited product through use of an identification tag that is associated with the product and that has transmissible authentication data allowing for an authenticity check. The authentication data are transmissible to a reader device, and the authentication data include source data and signature data. The source data include a tag identifier that uniquely identifies the identification tag and a product identifier that identifies a property value of the product, where the property value is verifiable by a measurement of the product, so that an authentic product is distinguishable from a non-authentic product on the basis of the property value. The signature value results from a private key encryption of a representation of the source data, where the private key encryption uses a private key of a public key encryption method.

The identification tag can be produced in an automatic way so that many identification tags can be produced in a short time. The identification tags are cheap to produce in mass production and do not require a modification of the authentic product. Consequently, it is feasible to use the identification tags for labelling many products. The identification tags can further provide the transmissible data in a short time so that many products can be checked for authenticity. Furthermore, the first embodiment is also reliable because transmissible data of the identification tag are partly created with a public key encryption method and have a high degree of security against counterfeiting. Therefore, it is very difficult for a counterfeiter to counterfeit the identification tag.

Another general aspect addresses how an interested party can check that a product associated with an identification tag is authentic using a verification device that reads and checks transmissible data from the identification tag and allows for checking the authenticity of the product by processing transmissible data of the identification tag. The verification device includes a reader unit configured to read the authentication data from the identification tag and a decryption engine. The decryption engine is configured to identify source data and a signature value from the authentication data read by the reader unit. The source data include a tag identifier that uniquely identifies the identification tag and a product identifier that identifies a property value of the product. The property value is verifiable by a measurement of the product to ensure that an authentic product is distinguished from a non-authentic product on the basis of the property value. The signature value represents a result of a private key encryption of a representation of the source data, where the private key encryption using a private key of a public key encryption method. The decryption engine is also configured to decrypt the signature value with a public key decryption using a public key, and the public key decryption is applicable to decrypt data that have been encrypted with the private key encryption using the private key. The decryption engine is also configured to check if the decrypted signature value is equal to the representation of the source data.

The verification device can read identification tags in an automatic way so that many identification tags can be read in a short time, thus allowing for a routine check of the authenticity of many products leading to a high success rate of discovering counterfeited products. Furthermore, results of the verification are reliable because the public key encryption method has a high degree of security against counterfeiting.

A further general aspect addresses how an authorized party can add a feature to an authentic product, which renders the authentic product distinguishable from a counterfeited product. In this aspect, a branding machine is used for writing at least one portion of authentication data to an identification tag, where the authentication data are transmissible from the identification tag to a reader unit of a verification device. The branding machine includes an encryption engine configured to provide a tag identifier that identifies uniquely the identification tag and a product identifier that identifies a property value of the product. The property value is verifiable by a measurement of the product, so that an authentic product is distinguishable from a non-authentic product on the basis of the property value. The encryption engine also is configured to compute a signature value that is a result of a private key encryption of a representation of source data that comprise the tag identifier and the product identifier, where the private key encryption uses a private key of a public key encryption method. The branding machine also includes a writing unit configured to write the signature value to the identification tag.

The authentication data can be determined and written to the identification tags in an automatic way so that many identification tags can be produced in a short time. The identification tags with the authentication data are cheap to produce in mass production and do not require a modification of the authentic product. Consequently, it is feasible to use the identification tags for labelling many products. Furthermore, the third embodiment is reliable because of an application of the public key encryption method and consequently it is difficult for a counterfeiter to counterfeit the identification tag.

A further general aspect addresses a computer-implemented method for creating at least one portion of the authentication data, where the authentication data are applicable to be stored on an identification tag. The method includes providing a tag identifier that identifies uniquely the identification tag and a product identifier that identifies a property value of the product, where the property value is verifiable by a measurement of the product, such that an authentic product is distinguishable from a non-authentic product on the basis of the property value. The method also includes computing a representation of source data that comprise the tag identifier and the product identifier and computing a signature value by encrypting the representation with a private key encryption, where the private key encryption uses a private key of a public key encryption method and where the authentication data comprise the source data and the signature value.

Another general aspect addresses a computer-implemented method for checking the authentication data, where the authentication data have been read from an identification tag. The method includes identifying source data from the authentication data, where the source data comprise a tag identifier that uniquely identifies the identification tag and a product identifier that identifies a property value of the product, where the property value is verifiable by a measurement of the product so that an authentic product is distinguishable from a non-authentic product on the basis of the property value. The method also includes identifying a signature value from the authentication data, where the signature value represents a result of a private key encryption of a representation of the source data, the private key encryption using a private key of a public key encryption method. The method also includes computing the representation of the source data, decrypting the signature value with a public key decryption using a public key, the public key decryption being applicable to decrypt data that have been encrypted with the private key encryption using the private key, and checking if the decrypted signature value is equal to the representation of the source data.

DETAILED DESCRIPTION

The following description contains examples and exemplary embodiments which do not limit a scope of the invention.

Figure 1A:
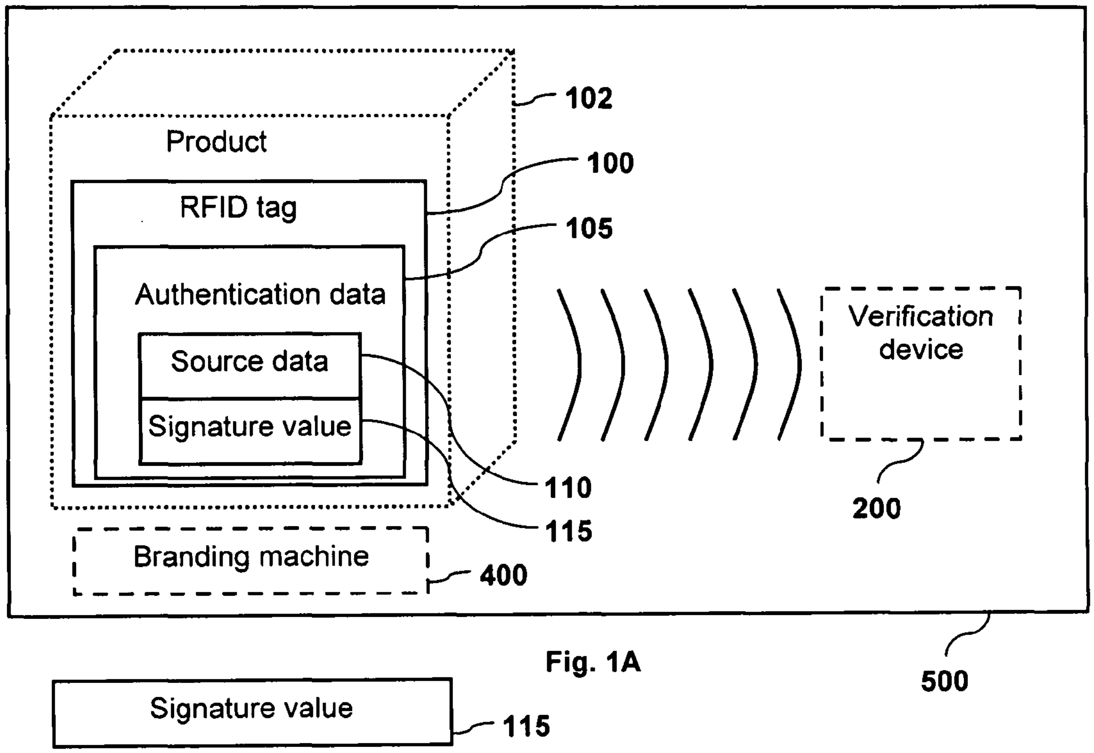
FIG. 1A is a block diagram of a system for identifying a tag together with a verification device and a branding machine.

FIG. 1A illustrates a system 500 that includes an exemplary identification tag 100 together with a verification device 200 and a branding machine 400. The system 500 further includes a product 102. The system 500 is applicable for authenticating the product 102. The system 500 for authenticating the product may not include the product 102 itself. The identification tag can be a passive radio frequency identification tag 100 that is attached to a product 102. As used herein, the passive radio frequency identification tag is be referred to as an RFID tag. The product 102 may be, for example, an automotive spare part, an aircraft spare part, a computer hardware, a toy or a computer game. Further examples for the product 102 are pharmaceutical products, spirits, and cosmetics. In the examples, checking the authenticity of the product 102 may be important because the quality of the product is important. A further reason for checking the authenticity of the product 102 may be that counterfeited products may be offered with a lower price compared to authentic products.

The RFID 100 tag can transmit data to the radio frequency identification reader device (RFID reader device). The RFID reader device may send radio frequency radiation that the RFID tag receives, which provide the power for transmitting data from the RFID tag 100 to the RFID reader device. Active radio frequency identification tags may be used. An active radio frequency identification tag has its own energy source for providing the power to transmit data to an active radio frequency reader device. As a consequence, active radio frequency identification tags are generally larger and more expensive compared to passive RFID tags. Generally, RFID tags 100 can be produced in large numbers in a cost efficient way, and they are able to store individual data. The stored data can be read fast and automatically, and a plurality of the RFID tags may be read nearly simultaneously and without requiring a precise alignment to the RFID reader device. The RFID tags 100 may also be read over a distance of a few meters and through package materials. The RFID tags can be read in an efficient way, that is, with a small impact on other processes in a production environment or a sales and distribution environment. The reading of an RFID tag in this efficient way is a feature of the RFID tag, which applies also to the identification tag. Therefore, use of an RFID tag 100 as an example for the identification tag allows for efficient reading and a routine authentication check of the product associated with the tag, resulting in a high success rate of discovering non-authentic products.

The product 102 is protected against counterfeiting because the RFID tag 100 provides several features for checking the authenticity of the product 102. As it is described in a detailed way in the description of FIG. 1B, the RFID tag 100 itself has a high level of security against counterfeiting the RFID tag. Furthermore, the RFID tag can be attached to the product 102 in a non-detachable way. For example, if the RFID tag 100 is detached from the product 102, the RFID tag may cease to remain functional after detachment. Therefore, an authentic RFID tag 100 of an authentic product 102 is not usable for attaching it to a further, possibly non-authentic product to pass an authentication check of the RFID tag. The RFID tag includes authentication data 105 that are transmissible to the verification device 200. The RFID tag may have additional transmissible data, such as a material number specifying the product type or a electronic product code uniquely specifying the product 102. However, the additional data generally may not be used for the authentication check. The authentication data 105 include source data 110 and a signature value 115. The system 500 includes the RFID tag 100 with the product 102, the verification device 200, and the branding machine 400. The verification device 200 is applicable for reading and processing the authentication data 105 and the branding machine 400 for writing at least a portion of the authentication data 105 to the RFID tag 100. The system 500 can include the product 102 because the RFID tag 100 is associated with the product in a non-detachable way, and the source data 110 can include also a product identifier 130. Due to this, the system 500 provides a high level of reliability with regard to a result of authenticating the product 102.

The transmissible authentication data 105 include the source data 110, which, again, include a tag identifier 125. The tag identifier 125 uniquely identifies the identification tag, that is, it is not used to identify further RFID tags. The tag identifier may be generated by a generator unit that is configured to use consecutive numbers for the RFID tags. As a further possibility, a globally unique identifier can be used for the tag identifier. The authentication data further include a signature value 115 that is a result of a private key encryption 120 of a representation 112 of the source data 110. The private key encryption 120 uses a private key of a public key encryption method. The public key encryption method allows an owner of the private key to encrypt data. Examples for public key encryption methods are the following: Rivest Shamir Adleman (RSA), Digital Signature Algorithm (DSA), Diffie-Hellmann, ElGamal, Rabin. The exemplary public key methods are considered secure, that is, it is currently not known how to break them. The encryption of the data requires the private key which is usually not available to other parties different from the owner of the private key. The encrypted data can be decrypted using an appropriate public key. The public key is usually given to interested parties for authenticating encrypted data. How to execute an authentication check of the RFID tag is described in further detail with respect to FIG. 3B. The authentication check relies on checking the relation between the source data and the signature value using the public key. The relation can be created by the owner of the private key and the relation relates always different data because the tag identifier is unique for every RFID tag. Therefore, the data of one RFID tag cannot be read and copied to a further RFID tag.

Figure 1B:
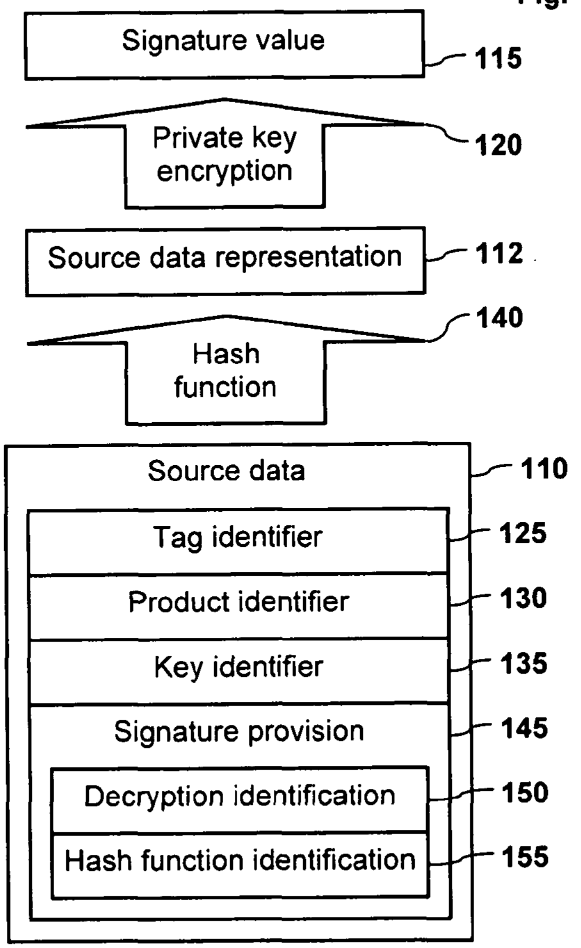
FIG. 1B is a block diagram of exemplary authentication data, and relations between authentication data, used in an RFID tag.

FIG. 1B illustrates exemplary authentication data 105 of the RFID tag and relations between the authentication data. As shown in FIG. 1B, the source data 110 include the tag identifier 125. The source data 110 can further include a product identifier 130. The product identifier 130 is an optional portion of the source data providing a further feature for authenticating the product 102. The product identifier 130 can specify a way of obtain a property value of the product 102. The property value can be verified by a measurement of the product, such that an authentic product is distinguished from a non-authentic product on the basis of the property value. In this respect, the product identifier 130 may be applicable for identifying the authentic product. The property value can specify, for example, any one of the following properties of the product 102: weight, electric resistance, geometric properties such as extension in one dimension or circumference. To be able to identify the authentic product, the property value may for example give the weight in micrograms. The property value may be identical to additional authentic products, or it may be different for additional authentic products. The property value specified by the product identifier can be compared to the weight measured by an interested party. A non-authentic product produced in a different way than the authentic product may differ with regards to the specified property value, and the comparison can lead to a discovery of the counterfeited product. Likewise, it is possible to specify the electrical resistance in micro Ohms or a geometric dimension such as, for example, the height of the product in micrometers. A further example of a property value is a serial number that uniquely identifies the individual product 102. In one example, the property value can be obtained when the product identifier 130 directly specifies the property value. In a further example, the property value can be obtained when the product identifier specifies accessing (e.g., through the Internet) a property value database providing the property value. For example, an address of an Internet server and a specification of a database and a database entry which contains the property value can be provided, so that the property value can be obtained. In a further example, the property value can be obtained by linking to an Internet page that provides the property value or it that includes a specification of a server supporting a file transfer protocol and a specification of a file containing the property value.

The source data 110 can further include a key identifier 135 that identifies the public key. The key identifier 135 is an optional portion of the source data. The public key is applicable to decrypt data that have been encrypted with the private key encryption 120 using the private key. With the public key, the interested party may check that the relation between the source data 110 and the signature value 115 are correct, that is, the signature value has been computed by the owner of the private key. For further security of the authentication check, the owner of the private key may be identified as an authentic producer of the product. For this, the key identifier 135 may identify the public key by specifying an access through the Internet to a database providing the public key. The database can be controlled by an authentication authority that maintains public keys for authenticating products. The authentication authority can be a trusted further party that is responsible for maintaining public keys of only authentic producers. The interested party authenticating the product may restrict the access through the Internet to databases that are controlled by the authentication authority. Using the access to the controlled database provides a high level of security against counterfeited RFID tags. Furthermore, the access to the controlled database may be automated and fast without requiring further activity of the interested party. Specifying the access through the Internet may, for example, include an address of an Internet server and a specification of a database and a database entry that contains the public key. In a further example, the access through the Internet may include a link to an Internet page providing the public key or it may include a specification of a server supporting a file transfer protocol and a specification of a file containing the public key. In a further example, the public key may also be directly identified by the key identifier without requiring the access through the Internet.

The source data 110 also can include a signature provision 145. The signature provision 145 can include two data: an identifier 150 of the public key decryption and an identifier 155 of a hash function 140 applied to the source data. The signature provision 145 gives the interested party a provision to execute the authentication check. In a further example, the data of the signature provision may be transmitted in a separate communication, for example, by sending a letter. However, including the signature provision in the RFID tag supports an automated and fast authentication check. The public key decryption identifier 150 may include an identification of the public key decryption method, for example, the Rivest Shamir Adleman method. The hash function identifier 155 may include an identification of the hash function 140, for example, the SH-1 hash function.

In the example, the source data 110 are related to the representation 112 of the source data by the hash function 140. In other words, the representation 112 of the source data 110 is a result of applying the hash function 140 to the source data. The representation 112 of the source data may be shorter, that is, contain fewer characters than the source data 110. In such a case, the representation of the source data is fast to encrypt, and the signature value may also be short compared to an encryption of the source data. Furthermore the hash function is nearly collision-free, that is, it assigns the representation 112 of the source data not to a further source data of a further identification tag. The hash function may be any one of the following hash functions: MD2, MD4, MD5, RIPEMD-160, SHA-1, SHA-224, SHA-256, SHA-384, SHA-512, Snefru, Tiger, Whirlpool. In a further example, the representation 112 of the source data may be identical to the source data 110, that is, instead of the hash function an identity function is applied to the source data.

The signature value 115 can be related to the source data representation 112 by the private key encryption 120. In other words, the signature value can be a result of the private key encryption 120 of the representation. The private key encryption 120 uses the private key of the public key encryption method.

Figure 2:
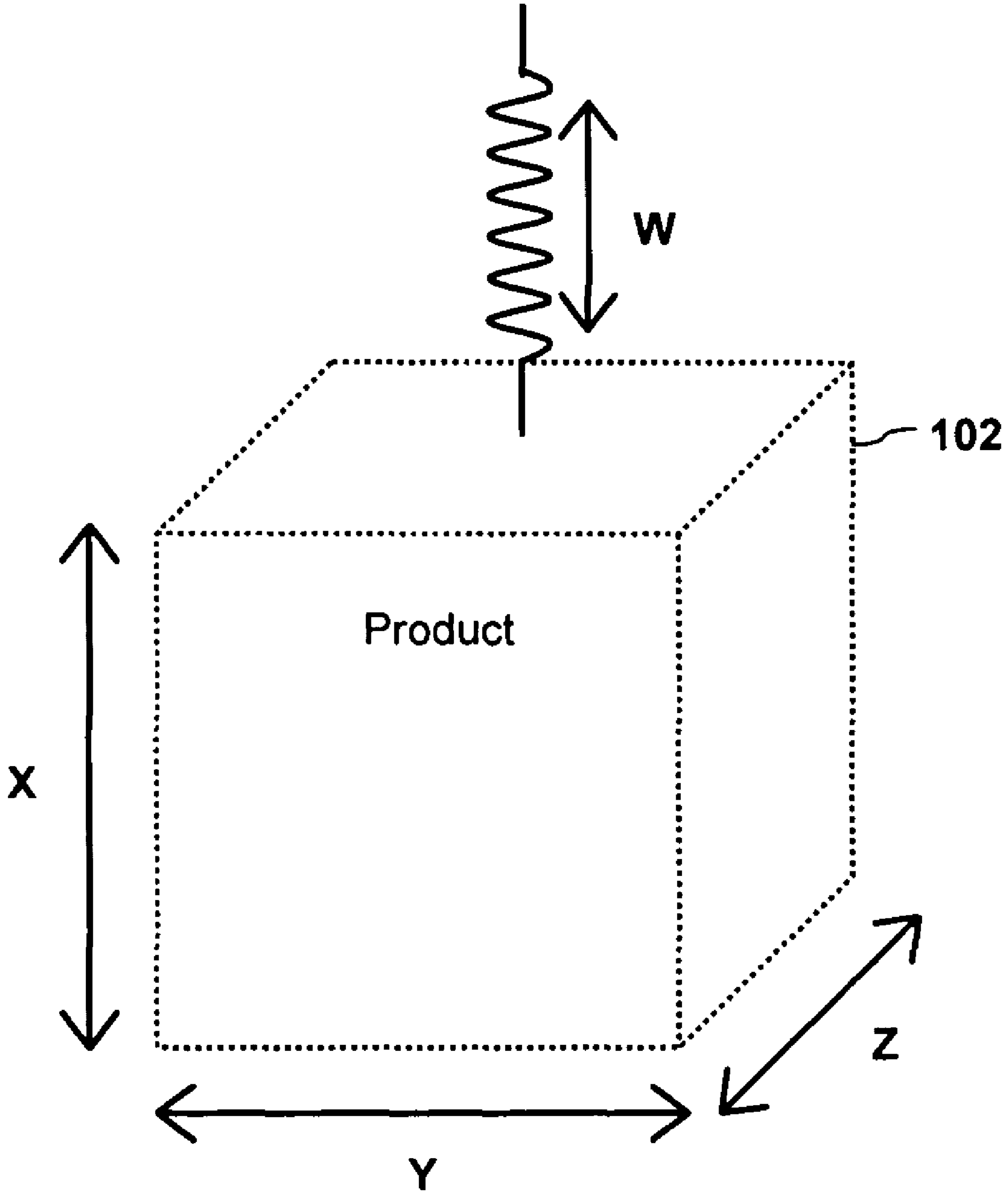
FIG. 2 is a block diagram of a product with which an identification tag may be associated.

FIG. 2 shows examples of properties of the product 102 with which an identification tag may be associated. The weight is a property of the product, which may be measured by a measurement device, for example a spring scale. The spring scale gives a measured value, W, that may be compared to the property value identified by the product identifier. In a further example, the weight may be measured automatically by a weighing machine, and the measured value may be compared to the property value in an automatic way. In a similar way to measuring the weight, measuring an extension in one direction may give a value, X. Measuring the extension in perpendicular directions may give values, Y or Z. The measured values, X, Y, and Z, may be compared to the one or more property values from the identification tag to increase the security level of the authentication check.

Figure 3A:
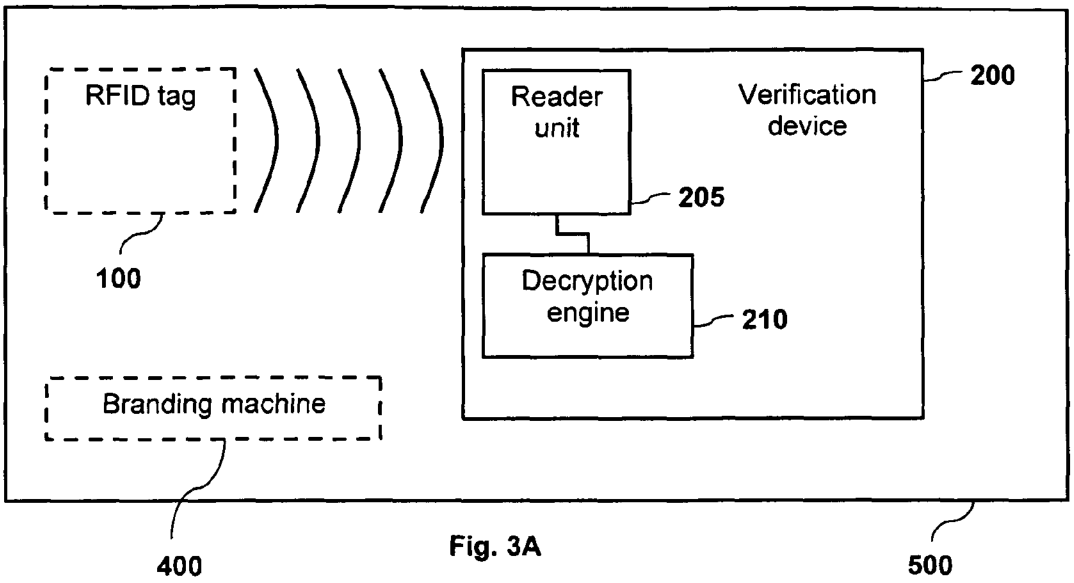
FIG. 3A is a block diagram of the system shown in FIG. 1A, including details of the verification device.

FIG. 3A illustrates the system 500 including details of the verification device 200. The verification device 200 is applicable to process the transmissible authentication data from the RFID tag 100. The verification device can include a reader unit 205 and a decryption engine 210. The reader unit 205 is configured to read the authentication data 105. The reader unit may also read further transmissible data that are provided by the RFID tag. The decryption engine 210 is configured to identify the source data 110 and the signature value 115, decrypt the signature value 115, and check a decrypted signature value 225. A line connecting the reader unit and the decryption engine represents an interface for transmitting the authentication data read by the reader unit from the reader unit 205 to the decryption engine 210. The decryption engine 210 can transform the signals transmitted from the reader unit into a format such that the source data 110 and the signature value 115 may be further processed.

Figure 3B:
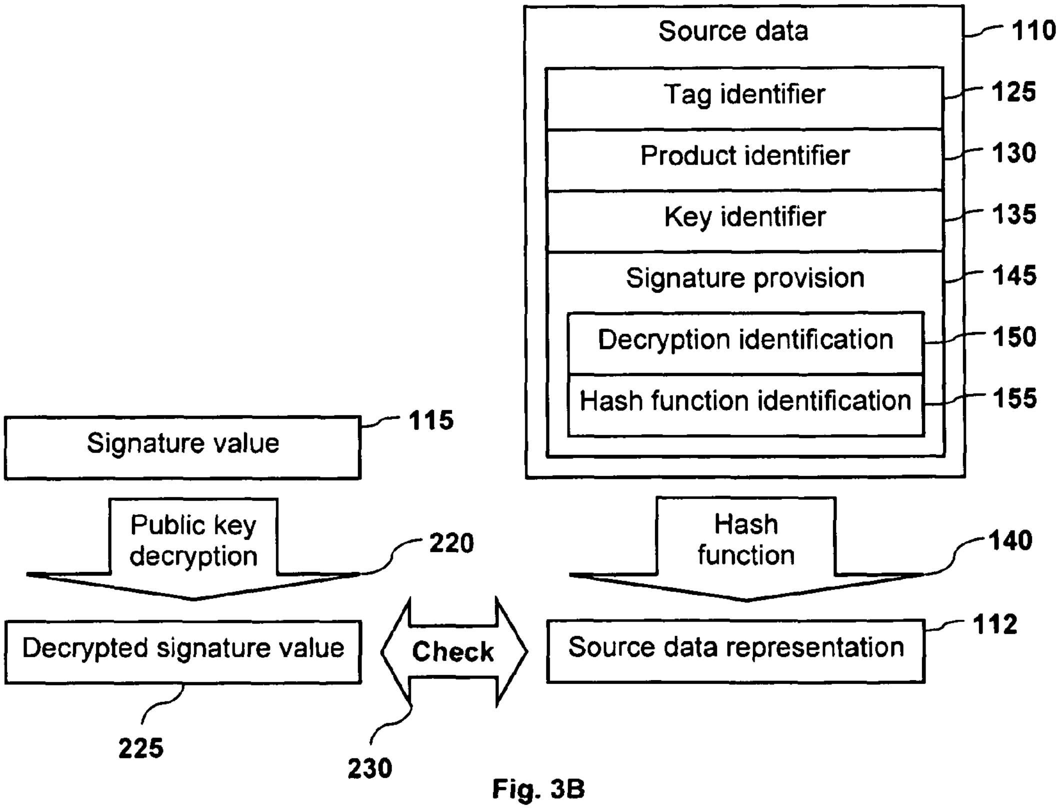
FIG. 3B is a block diagram of exemplary data, and relations between the data, processed by a decryption engine.

FIG. 3B illustrates exemplary data and relations between the data processed by the decryption engine 210. The signature value 115 and the decrypted signature value 225 are related by the public key decryption 220. Accordingly, the decryption engine decrypts the signature value 115 with a public key decryption 220 using the public key. The public key is applicable to decrypt data that have been encrypted with the private key encryption 120 using the private key. In this way the public key is linked to the private key. That is, only the appropriate public key will result in a decrypted signature value that is identical to the source data representation 112 that has been encrypted with the private key. In accordance with FIG. 1B, the source data 110 can include the tag identifier 125, the optional product identifier 130, the optional key identifier 135, and the optional signature provision 145. The source data 110 are related to the representation 112 of the source data through the application of the hash function 140. The decrypted signature value 225 and the representation 112 are related by a check 230 that compares the two data. Accordingly, the decryption engine 210 can be configured to check if the decrypted signature value 225 is equal to the representation 112. In case that the decrypted signature value 225 is equal to the source data representation 112 the authenticity check of the product gives a result that the product is authentic. In case that the decrypted signature value 225 is not equal to the source data representation 112 the authenticity check of the product gives a result that the product is not authentic.

Figure 4A:
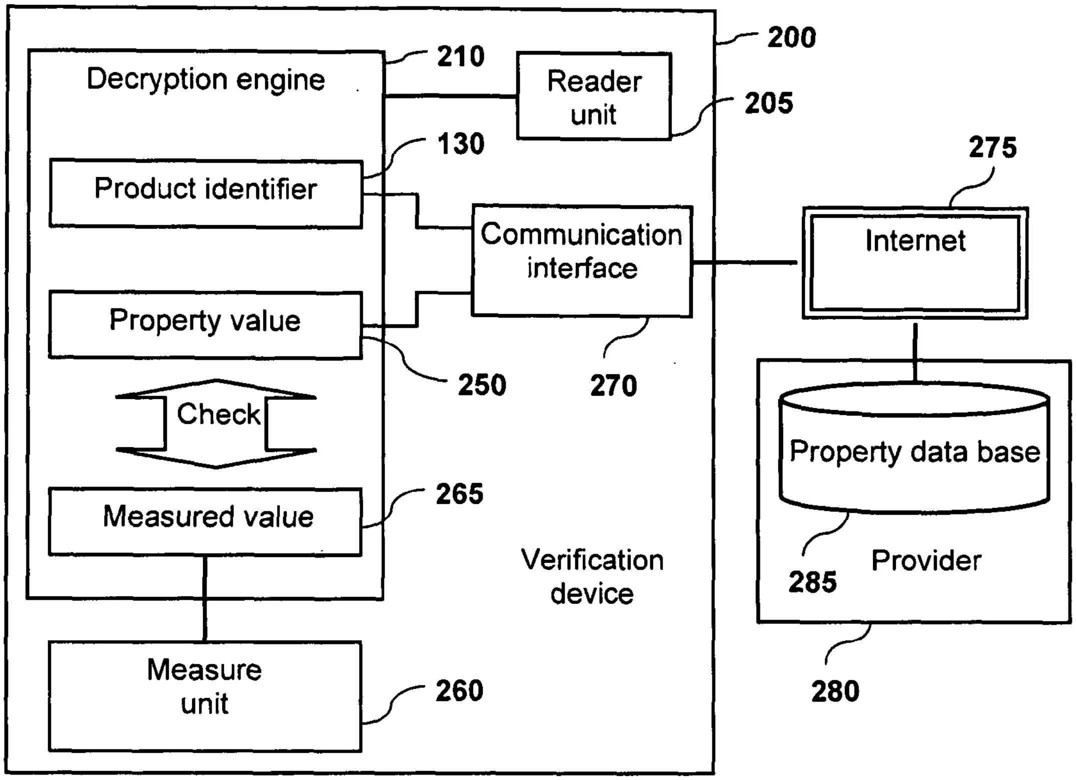
FIG. 4A is a block diagram of an exemplary verification device.

FIG. 4A illustrates an example of the verification device 200. In addition to the reader unit 205 and the decryption engine 210, the verification device 200 can include a measurement unit 260 and a communication interface 270. For convenience, only data and relations between data relevant to the implementation shown in FIG. 4A are illustrated in the figure. The measurement unit 260 is communicatively coupled to the decryption engine 210. In a further example, the measurement unit 260 may be implemented as an external device that, however, is still communicatively coupled to the decryption engine. The measurement unit 260 is applicable to measuring a property value 250 of the product 102, which is obtainable through the product identifier 130. The measurement unit 260 may be, for example, a spring scale for weighing the product with a required precision and a required tolerance. The required precision depends on a precision of the property value 250 and the required tolerances may be specified by the measurement device. The precision of the property value 250 is used so that an authentic product can be distinguished from a non-authentic product on the basis of the property value. In a further example, the required tolerance may also be specified together with the property values 250 by the product identifier 130. A measured value 265 is a result of a measurement of the measurement unit 260 and the measured value 265 is communicated to the decryption engine 210. In the example, the decryption engine 210 is configured to check if the measured value 265 corresponds to the property value 250 obtainable with the product identifier 130. A correspondence is given if the measured value 265 is equal to the property value 250 within the tolerances of the measured value. In a further example, the property value 250 may also be specified with a tolerance value. In this case, the difference between the property value 250 and the measured value 265 is not allowed to be greater than the sum of the tolerance of the property value and the tolerance of the measured value for a correspondence to occur.

The verification device 200 may include the communication interface 270 between the decryption engine 210 and the Internet 275. The communication interface 270 is configured to provide the access for the decryption engine 210 to the property value 250. The property value 250 is provided by a database 285 that is controlled by a provider 280. The provider 280 may be an authentic producer of the product or a further party. The communication interface 270 is adapted to the product identifier 130 so that the product identifier 130 is sufficient to obtain the property value 250. For example, if the product identifier 130 specifies a link to an Internet page that provides the property value 250, the communication interface is able to provide the property value to the decryption engine 210. The decryption engine 210 may then use the property value 250 to compare it to the measured value 265.

Figure 4B:
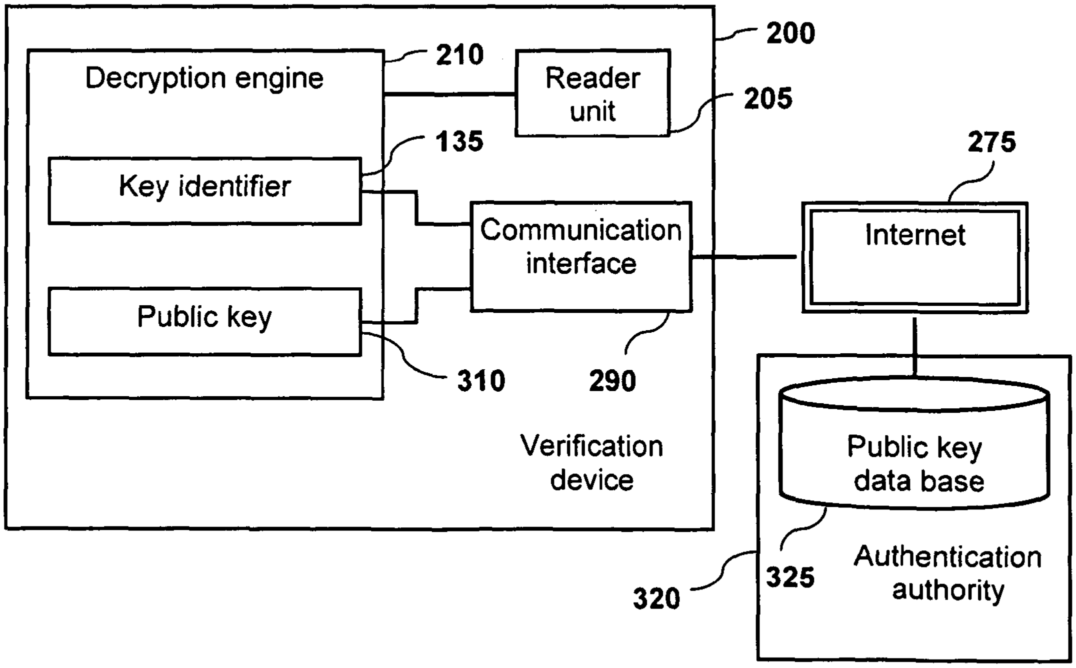
FIG. 4B is a block diagram of a further exemplary verification device.

FIG. 4B illustrates an example of a further implementation of the verification device 200. The further implementation includes a communication interface 290 between the decryption engine 210 and the Internet 275. For convenience, only data and relations between data specific to the implementation illustrated in FIG. 4B are shown. The communication interface 290 is configured to provide the access of the public key 310 from the database 325 to the decryption engine 210. The public key database 325 is controlled by the authentication authority 320. The interested party checking the authentication of the product may confide in the authentication authority 320 to provide only public keys of authentic producers. The communication interface 290 may be configured to access only databases of authentication authorities the interested party confides in. The communication interface 270 can be adapted to the key identifier 135 so that the key identifier is sufficient to obtain the public key 310.

Figure 5:
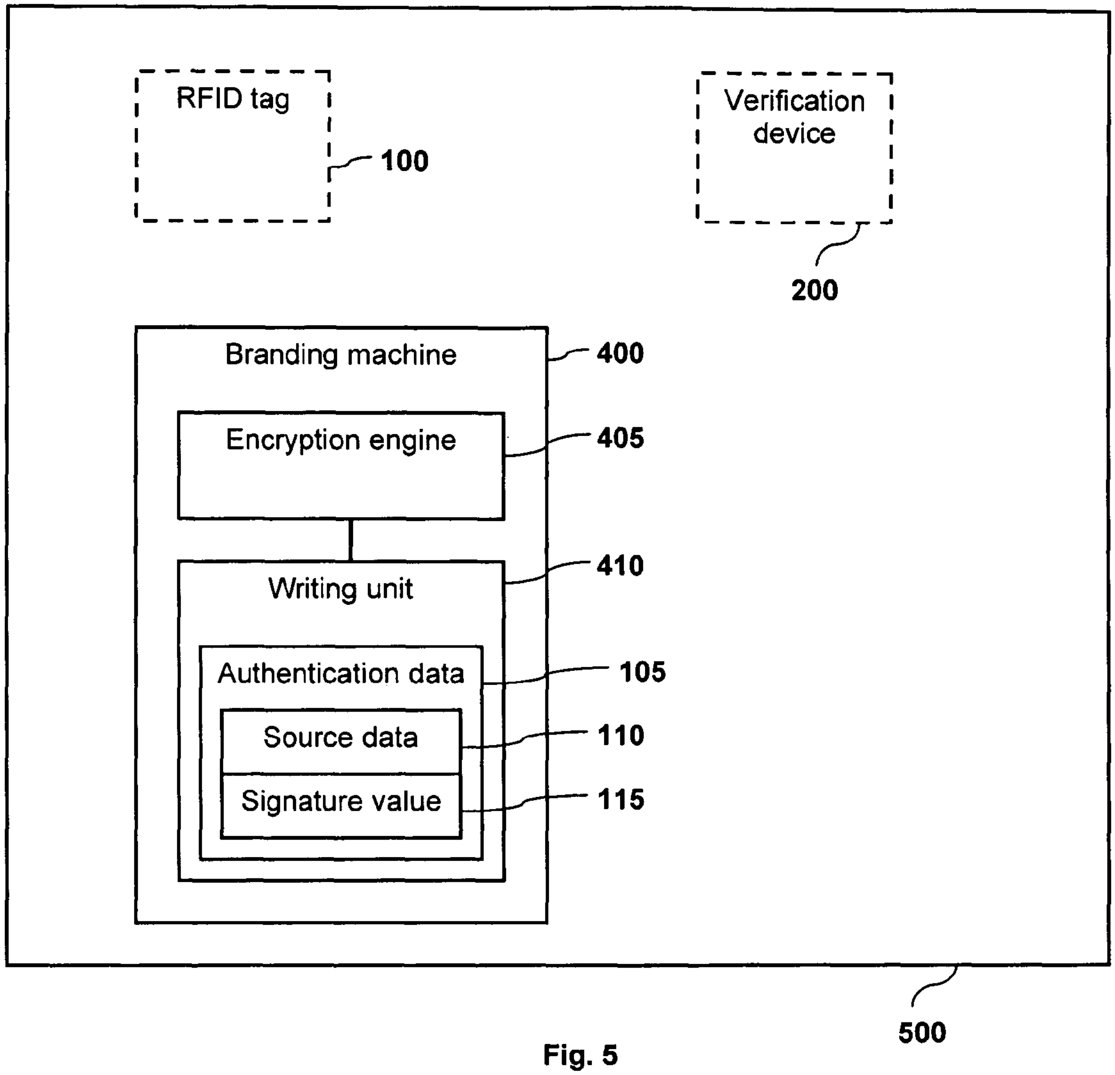
FIG. 5 is a block diagram of the system shown in FIG. 1A, including details of the branding machine.

FIG. 5 illustrates the system 500 including details of the branding machine 400. The branding machine 400 is applicable to create at least one portion of the authentication data 105 and to write the at least one portion of the authentication data to the RFID tag 100. The branding machine 400 may also write additional data to the RFID tag 100, for example, the material number identifying the product type. The authentication data 105 are transmissible to the reader device 200 for the authentication check, and therefore the system 500 also includes the branding machine 400. The branding machine includes an encryption engine 405 and a writing unit 410. The encryption engine 405 is configured to provide the tag identifier 125 and to compute the signature value 115. In an example, the tag identifier 125 may have been previously written to the RFID tag 100 and may be accessible by reading the tag identifier from the RFID tag. In a further example, providing the tag identifier 125 may include generating the tag identifier. In a further example, the tag identifier 125 may be generated by an external device and transmitted to the encryption engine to compute the signature value 115. The signature value is the result of the private key encryption 120 of the representation 112 of the source data 110. The private key encryption 120 uses the private key of the public key encryption method. The source data 110 are related to the source data representation 112 through the application of the hash function 140 to the source data 110. In a further example, the source data 110 may be related to the representation through the application of the identity function. That is, the source data 110 can be identical to the representation. As shown in FIG. 1B, the source data 110 can include the tag identifier 125, the optional product identifier 130, the optional key identifier 135, and the optional signature provision 145. The encryption engine 405 is connected to the writing unit by an interface that is illustrated by a line connecting them in FIG. 5. The writing unit 410 is configured to write the at least one portion of the authentication data 105 received from the encryption engine 405 to the identification tag 100.

Figure 6A:
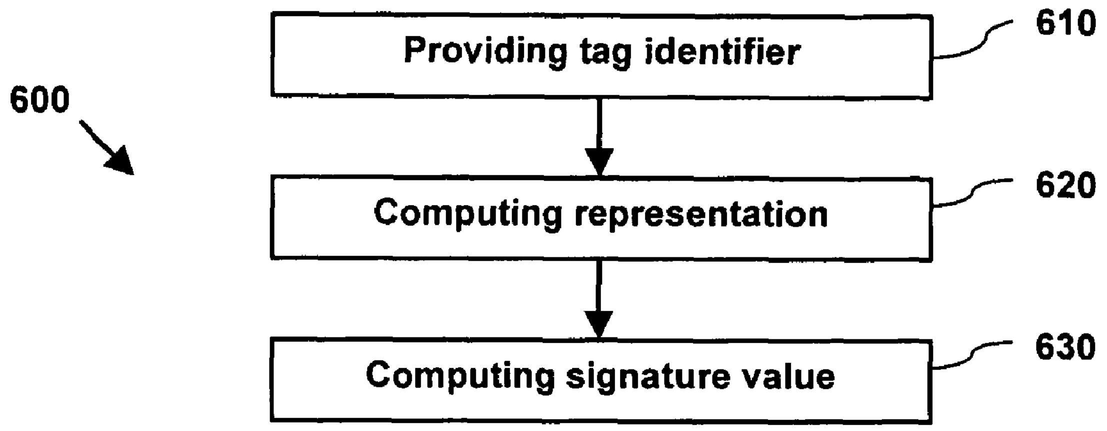
FIG. 6A is a flow chart of a process for creating at least one portion of authentication data.

FIG. 6A illustrates steps of a computer-implemented method 600 for creating the at least one portion of the authentication data 105 that are described herein, also with respect to FIG. 1A. In one example, the signature value 115 may be identical to the at least one portion of the authentication data 105. In a further example, the authentication data 105 may be identical to the at least one portion of the authentication data. A first method step includes providing 610 the tag identifier. Providing 610 the tag identifier may be done by the encryption engine 405 of the branding machine 400. Other method steps include computing 620 the representation of source data 110 that comprise the tag identifier 125 and computing 630 the signature value by encrypting the representation. The steps of computing 620 the representation of the source data and computing the signature value may also be done by the encryption engine 405. Encrypting can include applying the private key encryption using the private key of the public key encryption method. The authentication data can include the source data 110 and the signature value 115. The method step computing 620 the source data representation 112 may include applying the hash function 140, as also described herein with reference to FIG. 1B, to the source data 110 so that the representation is in a format that may be shorter and more convenient for encryption. In a further example, computing 620 the source data representation 112 may include applying the identity function to the source data 110 so that the representation is identical to the source data. The source data may further include the signature provision 145, as also described herein with reference to FIG. 1B,) which comprises the identifier of the public key decryption and the identifier of the hash function. Furthermore, source data 110 may include the product identifier 130 and the key identifier 135, as also described herein with reference to FIG. 1B.

Figure 6B:
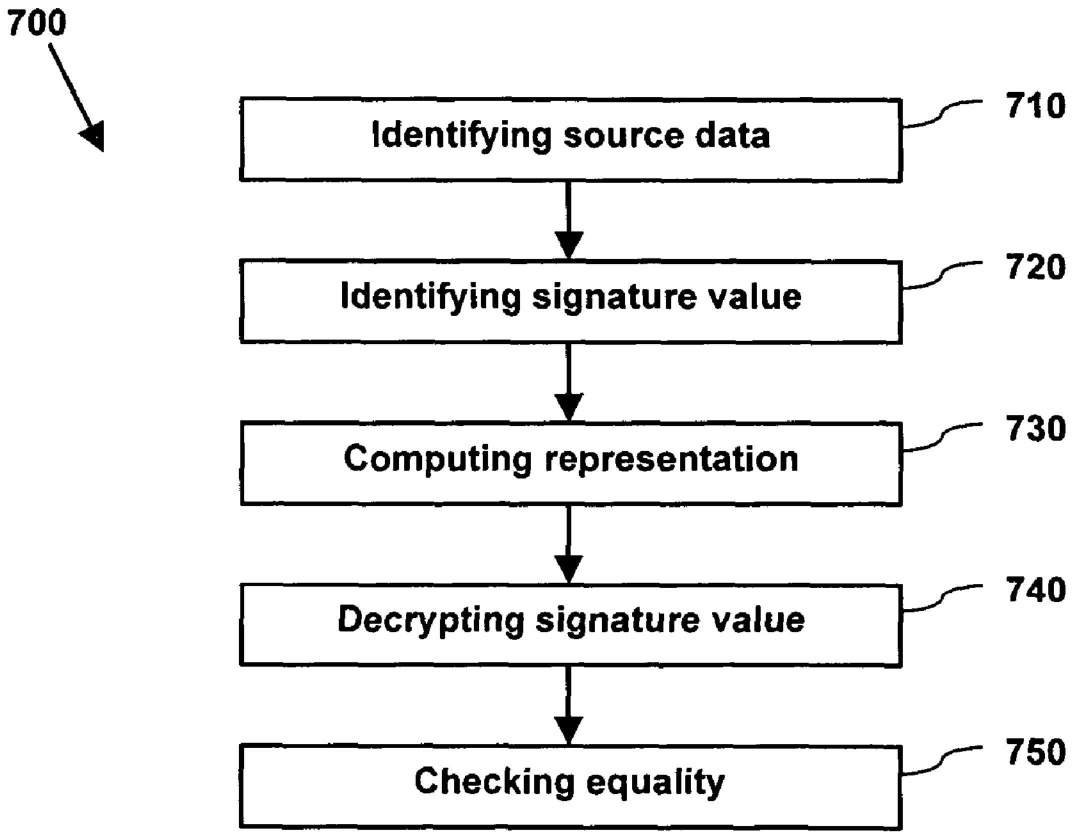
FIG. 6B is a flow chart of a process for checking authentication data.

FIG. 6B illustrates a further computer-implemented method 700 for checking the authentication data 105, as also described herein with reference to FIG. 1A. The method 700 includes the steps of identifying 710 the source data from the authentication data, identifying 720 the signature value 115 from the authentication data, and computing 730 the representation 112 of the source data 110. The method 700 further includes decrypting 740 the signature value 115 with the public key decryption 220, as also described herein with reference to FIG. 1B, and checking 750 if the decrypted signature value 225 is equal to the representation 112. The steps of the method 700 may be executed by the decryption engine 210 of the verification device 200. As shown in FIG. 1B, the source data 110 may further include the signature provision 145, the product identifier 130, and the key identifier 135.

Features of data included in the source data and relations between the data as described in FIG. 1 to FIG. 4 may also characterize the data and the relations used in any one of the methods 600 or 700. The methods 600 and 700 are related because using method 600 for checking the authentication data with specific features can require creating the authentication data with the specific features according to method 700.

A following example illustrates how features of exemplary authentication data 105 are relevant for the identification tag 100, the verification device 200, and the branding machine 400, as well as for the methods for creating and checking the authentication data. In the example, the product 102 (see FIG. 1A) can be a spare part of a car. In the following, exemplary names are indicated by quotation marks. The product 102 can have two relevant properties, e.g., weight and electrical resistance. An exemplary spare part vendor and manufacturer "ENTERPRISE XY" desires to use the methods and the products described above to prevent counterfeiting of its products. Before shipping an exemplary spare part with product code "SPART" and serial number "i" the manufacturer will equip the spare part "SPART/i" with an RFID tag. The RFID has a tag identifier "TAG/ID". A vendor of the RFID tag generates the "ID" and guarantees that the "ID" is unique and also that it is stored in a read-only part of a memory of the RFID tag.

The spare part manufacturer "ENTERPRISE XY" writes further elements of authentication data into a further memory part of the RFID tag. The spare part manufacturer may access the tag identifier "TAG/ID," which is provided in the memory of the RFID tag. The vendor may use a branding machine that reads the value of the tag identifier from the tag and writes a portion of the authentication data to the RFID tag. The authentication data of the RFID tag attached to the spare part "SPART/i" is represented by "AD/i". The "AD/i" may contain the following information:

```
"AD/I"
= { vendor = "ENTERPRISE XY", product code =
"SPART", serial number="i",
weight="34.37 Grams", resistance="234.67 Ohm",
unique tag identifier="ID", signature
provision = "sha1 with rsa512", signature value =
"2E 62 22 D3 3C 64 A4 43 3F 45 4A
88 94 9A C8 37 35 10 04 8D 39 CD 1E C9 9C 1B FD 83 B3 8B 7C 2A
8E FA 72 77 F7
08 E7 95 58 18 1A EF AA 20 1A 5E 20 DB 56 44 F0 6D 07 F8 66 AC
1B 44 E1 41 CA
00", key identifier = "http://www.keys.com/valkeys/vendor/
ENTERPRISE XY" }.
```

The example value of signature value was computed by using the hash function SHA-1 and the public key encryption method RSA with a key-length of 512 bits as indicated by signature provision. The signature value is represented by a sequence of hexadecimal number pairs each encoding 8 bits. After receiving spare part "SPART/i" a service technician who is responsible for maintenance of cars will validate whether the product is fake or authentic.

In accordance to the previous exemplary implementation, a technician can read the contents of the tag identifier "TAG/ID" that comprises the authentication data "AD/i". For this the technician can use a verification device that may be mobile for better handling. The verification device automatically determines the signature provision, that is, SHA-1 and RSA512 required to verify "AD/i". Following this, the verification device computes the hash value

```
H [test]
= h [SHA-1] ( vendor = "ENTERPRISE XY", product code =
"SPART", serial number =
"i", weight="34.37 Grams", resistance = "234.67 Ohm",
unique tag identifier = "ID",
```

-continued

```
signature provision = "sha1 with rsa512", key identifier =
"http://www.keys.com/valkeys/vendor/ENTERPRISE XY.cer" )
= 0B ED F0 D0 90 20 E5 45 53 97 4E 1C 14 4A 70 18 7B 54 3B A0
```

After that the verification device downloads a certificate of "ENTERPRISE XY", the certificate containing the public key "PU" of "ENTERPRISE XY" to validate the signature value generated by "ENTERPRISE XY". To achieve this, the verification device connects to the Internet and downloads the certificate via the link "http://www.keys.com/valkeys/vendor/ENTERPRISE XYcer". In this example, the public key "PU" stored in folder "ENTERPRISE XY.cer" is a 512 bit RSA key with the hexadecimal value

```
"PU"
= { Modulus = FD 6E 14 38 C1 CC AA B2 94 5A 24 40 EA 33 DA
34 F1 B2 BA FF 95
79 36 61 33 CF 69 01 83 78 82 0C D5 06 9B 3C 18 AD 51 88 84 91 54
F0 9B 3E E1 A3
67 43 96 2E D9 0A 22 FA A2 E1 3A 69 CA 7B 96 DF, Exponent =
010001 }.
```

Following this, the signature value is validated by computing

```
"check"
= S[PU] ( 2E 62 22 D3 3C 64 A4 43 3F 45 4A 88 94 9A C8 37 35
10 04 8D 39 CD 1E
C9 9C 1B FD 83 B3 8B 7C 2A 8E FA 72 77 F7 08 E7 95 58 18 1A EF
AA 20 1A 5E 20
DB 56 44 F0 6D 07 F8 66 AC 1B 44 E1 41 CA 00 )
= 0B ED F0 D0 90 20 E5 45 53 97 4E 1C 14 4A 70 18 7B 54 3B A0.
```

Because "check" is equal to H[test] the authentication data "AD/i" are authentic and have not been altered. Therefore, the verification device generates a success message.

Furthermore, the technician may check whether the spare part really has the serial number "i" printed on it. The technician may also further weigh the spare part, measure its electric resistance and check whether the measured values correspond to the values given in "AD/i".

What is claimed is:

1. An identification tag for authenticating a product, wherein the identification tag is associated with the product and has authentication data transmissible to a reader device; the authentication data comprising:

source data comprising a tag identifier that uniquely identifies the identification tag, a key identifier, and a product identifier that directly identifies a physical property value of the product, wherein the key identifier identifies the public key by specifying an access through the Internet to a database providing the public key, wherein the database is controlled by an authentication authority that maintains public keys for authenticating products, and wherein the physical property value is verifiable by a measurement of the product so that an authentic product is distinguishable from a non-authentic product on the basis of the physical property value; and a signature value being a result of a private key encryption of a representation of the source data, wherein the private key encryption uses a private key of a public key encryption method, wherein the key identifier identifies a public key that is applicable with a public key decryption to decrypt data which have been encrypted with the private key encryption using the private key.

2. The identification tag of claim 1, wherein the physical property value of the product specifies one of the following properties: weight, electric resistance, a geometric property such as an extension in one dimension or a circumference.

3. The identification tag of claim 1, wherein the public key encryption method includes any one of the following public key encryption methods: Rivest Shamir Adleman (RSA), Digital Signature Algorithm (DSA), Diffie-Hellmann, ElGamal, Rabin.

4. The identification tag of claim 1, wherein the representation of the source data is a result of applying a hash function to the source data, wherein the hash function assigns the representation to the source data and the representation is not assigned to a further source data of a further identification tag.

5. The identification tag of claim 4, wherein the hash function is any one of the following hash functions: MD2, MD4, MD5, RIPEMD-160, SHA-1, SHA-224, SHA-256, SHA-384, SHA-512, Snefru, Tiger, Whirlpool.

6. The identification tag of claim 4, wherein the source data further comprise a signature provision that comprises an identifier of the public key decryption and an identifier of the hash function applied to the source data.

7. The identification tag of claim 1, wherein the identification tag is a passive radio frequency identification tag that derives the power for transmitting data from the reader device.

8. The identification tag of claim 1, wherein the identification tag is associated with the product in a non-detachable way so that the identification tag is unusable for a further product.

9. A verification device for authenticating a product, wherein the verification device uses transmissible authentication data from an identification tag associated with the product; the verification device comprising:

a reader unit configured to read the authentication data from the identification tag; and a decryption engine configured to:

identify source data and a signature value from the authentication data read by the reader unit, wherein the source data comprise a tag identifier that uniquely identifies the identification tag and a product identifier that directly identifies a physical property value of the product, wherein the physical property value is verifiable by a measurement of the product that an authentic product is distinguishable from a non-authentic product on the basis of the physical property value and wherein the signature value represents a result of a private key encryption of a representation of the source data, the private key encryption using a private key of a public key encryption method;

decrypt the signature value with a public key decryption using a public key, the public key decryption being applicable to decrypt data which have been encrypted with the private key encryption using the private key;

identify a key identifier comprised by the source data, wherein the key identifier identifies a public key that is applicable to decrypt data that have been encrypted with the private key encryption using the private key, wherein the key identifier identifies the public key by specifying an access through the Internet to a database providing the public key, wherein the database is controlled by an authentication authority that maintains public keys for authenticating products; and check if the decrypted signature value is equal to the representation of the source data.

10. The verification device of claim 9, wherein the decryption engine is communicatively coupled to a measure unit for measuring the physical property value of the product.

11. The verification device of claim 10, wherein the cryptographic engine is further configured to check if the value measured by the measure unit corresponds to the physical property value obtainable with the product identifier.

12. The verification device of claim 9 further comprising a communication interface between the cryptographic engine and the Internet.

13. The verification device of claim 12, wherein the communication interface is configured to provide an access for the decryption engine to the public key from a database using the key identifier.

14. The verification device of claim 9, wherein the representation of the source data is a result of applying a hash function to the source data, wherein the hash function assigns the representation to the source data and the representation is not assigned to a further source data of a further identification tag.

15. The verification device of claim 9, wherein the source data further comprise a signature provision comprising an identifier of the public key decryption and an identifier of the hash function applied to the source data.

16. The verification device of claim 9, wherein the reader unit is configured to read the authentication data from a passive radio frequency identification tag and to provide power to the passive radio frequency identification tag for transmitting the authentication data.

17. A branding machine for writing at least one portion of authentication data to an identification tag, wherein the authentication data are transmissible from the identification tag to a reader unit of a verification device; the branding machine comprising:

an encryption engine configured to:

provide a tag identifier that identifies uniquely the identification tag, a product identifier that directly identifies a physical property value of the product, wherein the physical property value is verifiable by a measurement of the product so that an authentic product is distinguishable from a non-authentic product on the basis of the physical property value, and a key identifier; and compute a signature value that is a result of a private key encryption of a representation of source data that comprise the tag identifier and the product identifier, wherein the private key encryption uses a private key of a public key encryption method, wherein the source data further comprise a key identifier that identifies a public key, the public key being applicable to decrypt data that have been encrypted with the private key encryption using the private key, wherein the key identifier identifies the public key by specifying an access through the Internet to a database providing the public key, wherein the database is controlled by an authentication authority that maintains public keys for authenticating products; and a writing unit configured to write the signature value to the identification tag.

18. The branding machine of claim 17, wherein the writing unit is further configured to write the source data to the identification tag.

19. The branding machine of claim 18, wherein the physical property value of the product specifies any of the following properties: weight, electric resistance, geometric properties such as extension in one dimension or circumference.

20. The branding machine of claim 17, wherein the representation of the source data is a result of applying a hash function to the source data, wherein the hash function assigns the representation to the source data and the representation is not assigned to a further source data of a further identification tag.

21. The branding machine of claim 20, wherein the source data further comprise a signature provision that comprises an identifier of the public key decryption and an identifier of the hash function applied to the source data.

22. A computer implemented method for creating at least one portion of authentication data, wherein the authentication data are applicable to be stored on an identification tag; the method comprising:

providing a tag identifier that identifies uniquely the identification tag and a product identifier that directly identifies a physical property value of the product, wherein the physical property value is verifiable by a measurement of the product so that an authentic product is distinguishable from a non-authentic product on the basis of the physical property value;

computing a representation of source data that comprise the tag identifier and the product identifier and a key identifier that identifies a public key, the public key being applicable with the public key decryption to decrypt data which have been encrypted with the private key encryption using the private key, wherein the key identifier identifies the public key by specifying an access through the Internet to a database providing the public key, wherein the database is controlled by an authentication authority that maintains public keys for authenticating products; and computing a signature value by encrypting the representation with a private key encryption, wherein the private key encryption uses a private key of a public key encryption method and wherein the authentication data comprise the source data and the signature value.

23. The method of claim 22, wherein computing the representation comprises applying a hash function to the source data.

24. The method of claim 23, wherein the source data further comprise a signature provision that comprises an identifier of a public key decryption and an identifier of the hash function applied to the source data, wherein the public key decryption is applicable to decrypt data which have been encrypted with the private key encryption.

25. A computer implemented method for checking authentication data, wherein the authentication data have been read from an identification tag; the method comprising:

identifying source data from the authentication data, wherein the source data comprise a tag identifier which uniquely identifies the identification tag, a key identifier that identifies a public key, wherein the key identifier identifies the public key by specifying an access through the Internet to a database providing the public key, wherein the database is controlled by an authentication authority that maintains public keys for authenticating products, the public key being applicable to decrypt data which have been encrypted with the private key encryption using the private key, and a product identifier which directly specifies a physical property value of the product, wherein the physical property value is verifiable by a measurement of the product so that an authentic product is distinguishable from a non-authentic product on the basis of the physical property value;

identifying a signature value from the authentication data, wherein the signature value represents a result of a private key encryption of a representation of the source data, the private key encryption using a private key of a public key encryption method;

computing the representation of the source data;

decrypting the signature value with a public key decryption using a public key, the public key decryption being applicable to decrypt data which have been encrypted with the private key encryption using the private key; and checking if the decrypted signature value is equal to the representation of the source data.

26. The method of claim 25, wherein computing the representation comprises applying a hash function to the source data.

27. The method of claim 26, wherein the source data further comprise a signature provision which comprises an identifier of the public key decryption and an identifier of the hash function applied to the source data.

28. The identification tag of claim 1, wherein the physical property value is specified with a predetermined precision, and wherein an authentic product is distinguishable from a non-authentic product on the basis of the physical property value and the predetermined precision with which the physical property value is specified.

29. The identification tag of claim 9, wherein the physical property value is specified with a predetermined precision, and wherein an authentic product is distinguishable from a non-authentic product on the basis of the physical property value and the predetermined precision with which the physical property value is specified.

30. The identification tag of claim 17, wherein the physical property value is specified with a predetermined precision, and wherein an authentic product is distinguishable from a non-authentic product on the basis of the physical property value and the predetermined precision with which the physical property value is specified.

31. A system for authenticating a product comprising:

an identification tag associated with the product and including authentication data transmissible to a reader device for authenticating a product;

a verification device that uses the transmissible authentication data from the identification tag; and a branding machine for writing at least one portion of authentication data to the identification tag, wherein the authentication data comprise source data including a tag identifier that uniquely identifies the identification tag and a product identifier that directly identifies a physical property value of the product, wherein the physical property value is verifiable by a measurement of the product so that an authentic product is distinguishable from a non-authentic product on the basis of the physical property value, wherein the source data comprise a key identifier that identifies a public key and a signature value that is a result of a private key encryption of a representation of the source data, wherein the private key encryption uses a private key of a public key encryption method, wherein the key identifier identifies the public key by specifying an access through the Internet to a database providing the public key, wherein the database is controlled by an authentication authority that maintains public keys for authenticating products wherein the verification device comprises the reader device, and wherein the reader device is configured to read the authentication data from the identification tag, wherein the verification device comprises a decryption engine configured to:

identify the source data and the signature value from the authentication data read by the reader device;

decrypt the signature value with the public key decryption using the public key, the public key decryption being applicable to decrypt data that have been encrypted with the private key encryption using the private key; and check if the decrypted signature value is equal to the representation of the source data, wherein the branding machine comprises an encryption engine configured to:

provide the tag identifier and the product identifier; and compute the signature value; and wherein the branding device comprises a writing unit configured to write the signature value to the identification tag.

32. The identification tag of claim 22, wherein the physical property value is specified with a predetermined precision, and wherein an authentic product is distinguishable from a non-authentic product on the basis of the physical property value and the predetermined precision with which the physical property value is specified.

33. The identification tag of claim 25, wherein the physical property value is specified with a predetermined precision, and wherein an authentic product is distinguishable from a non-authentic product on the basis of the physical property value and the predetermined precision with which the physical property value is specified.

34. The identification tag of claim 31, wherein the physical property value is specified with a predetermined precision, and wherein an authentic product is distinguishable from a non-authentic product on the basis of the physical property value and the predetermined precision with which the physical property value is specified.

* * * * *